Aug. 7, 1945.   R. W. JOHNSON ET AL   2,381,756
LIQUID FUEL FEEDING MECHANISM
Filed Feb. 14, 1942   4 Sheets-Sheet 2
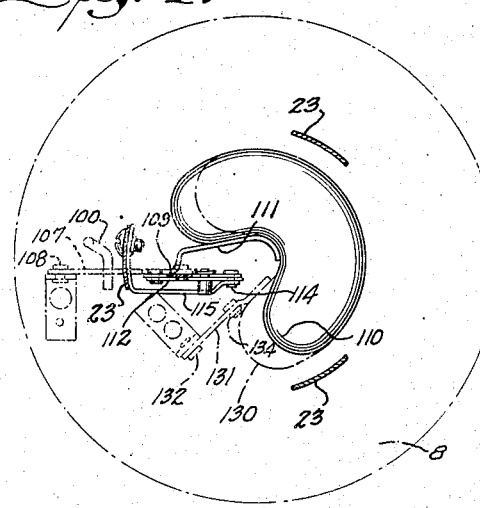
Fig. 4.
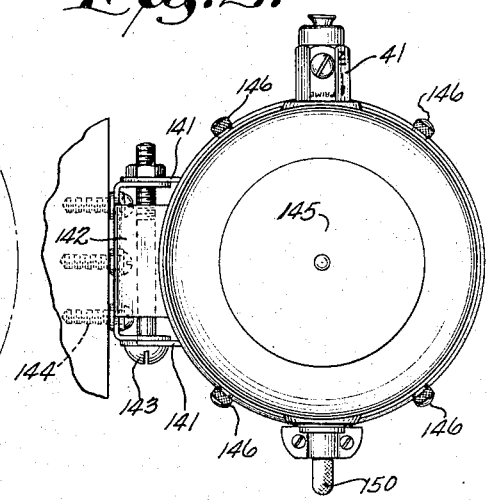
Fig. 2.
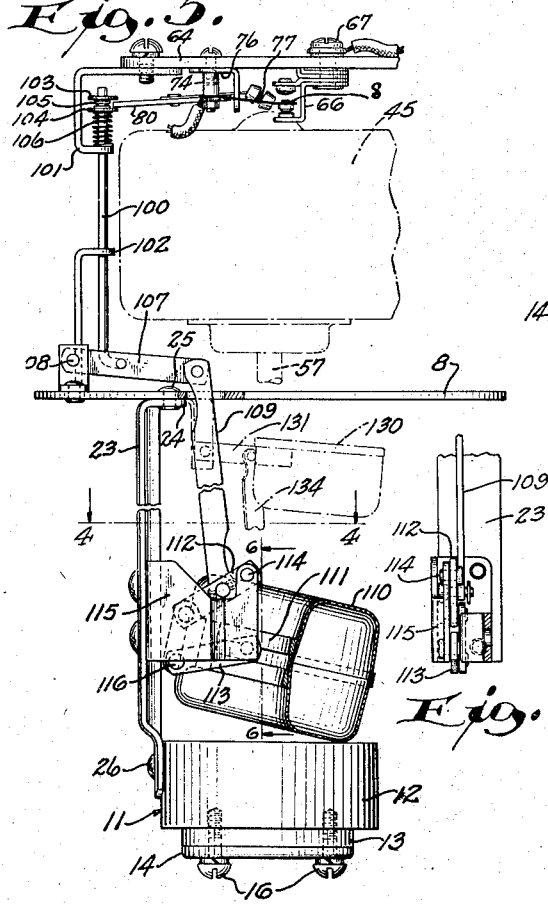
Fig. 5.
Fig. 6.
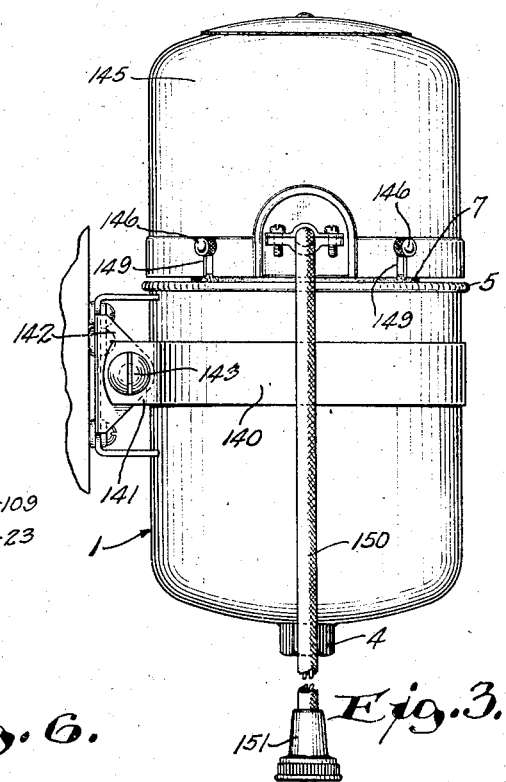
Fig. 3.
INVENTORS:
ROY W. JOHNSON
CEDRIC E. ZARWELL
BY John W. Wichael
ATTORNEY.

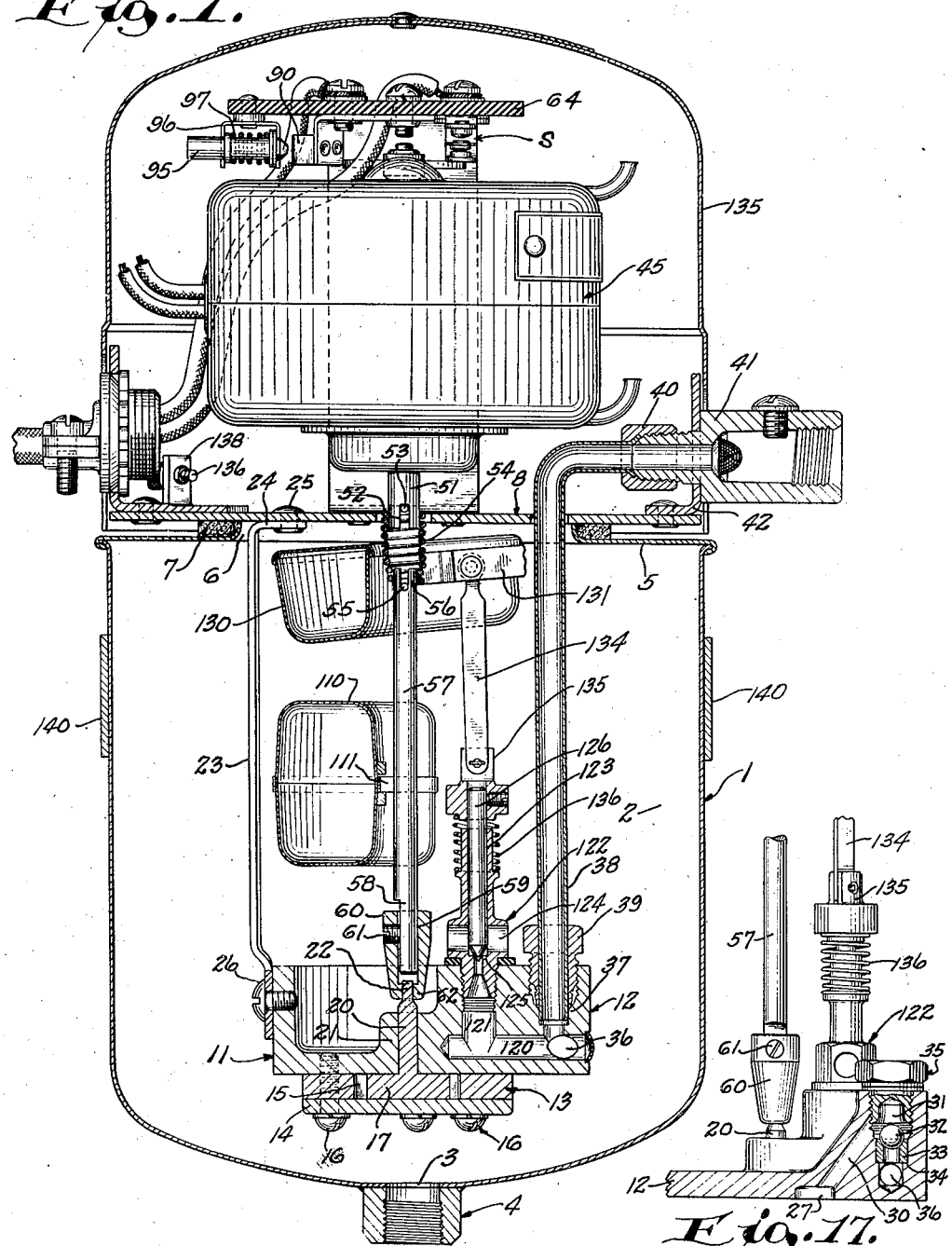

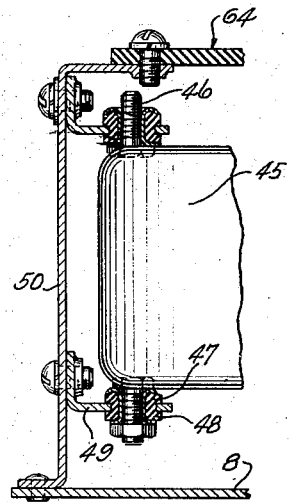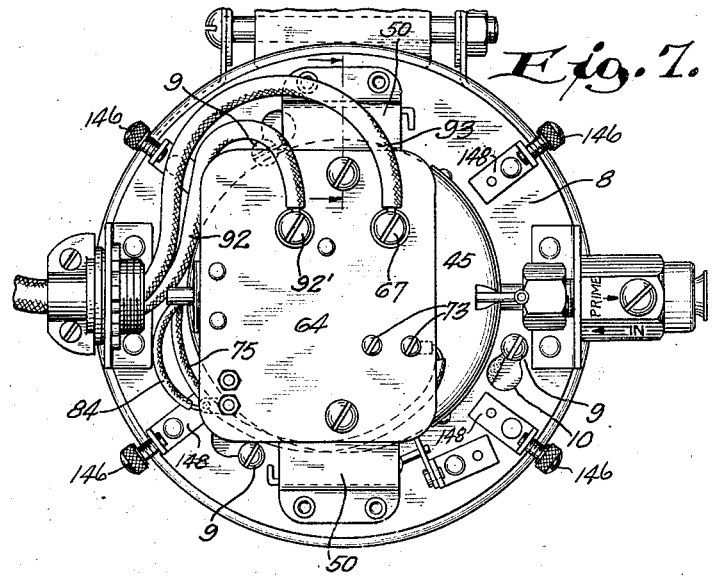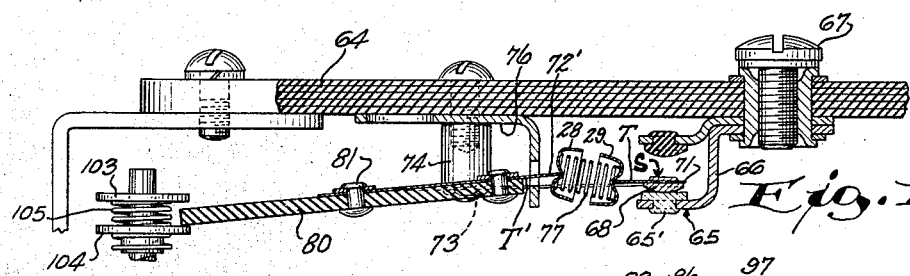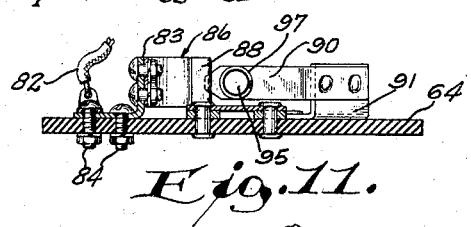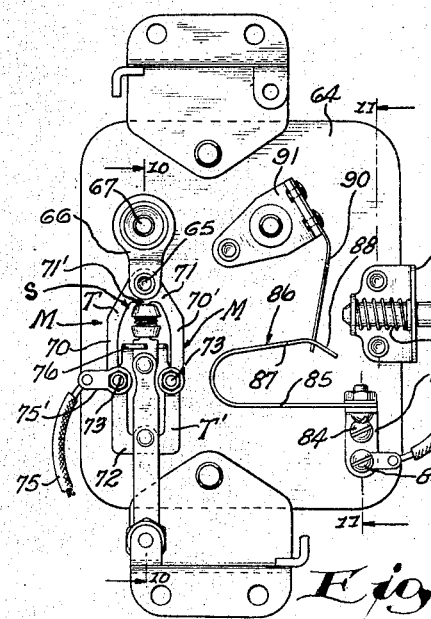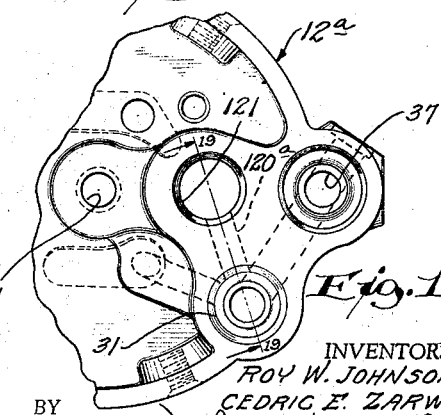
INVENTORS:
ROY W. JOHNSON
CEDRIC E. ZARWELL
ATTORNEY

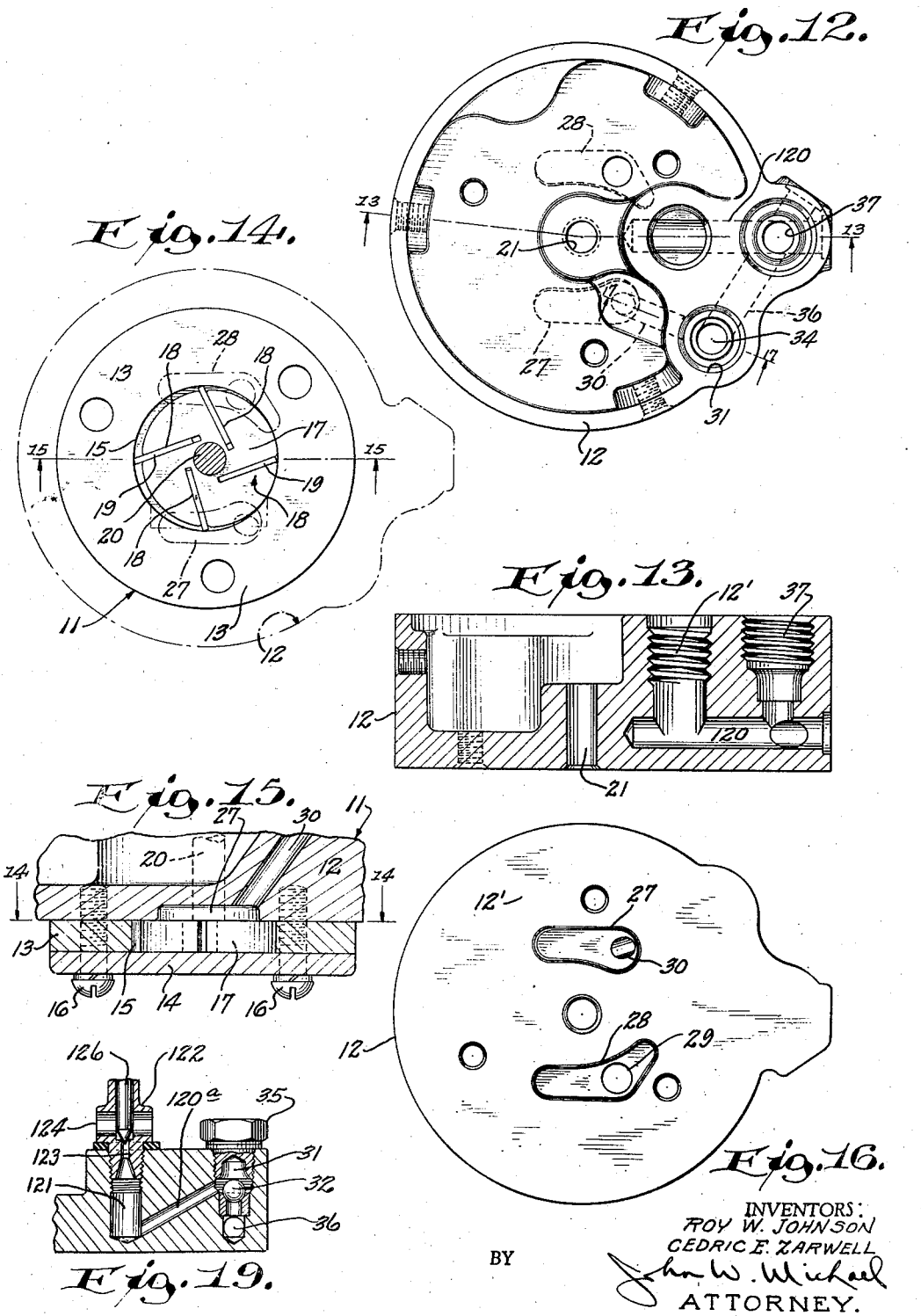

Patented Aug. 7, 1945

2,381,756

UNITED STATES PATENT OFFICE 2,381,756

LIQUID FUEL FEEDING MECHANISM

Roy W. Johnson and Cedric E. Zarwell, Milwaukee, Wis., assignors to Automatic Products Company, Milwaukee, Wis., a corporation of Wisconsin Application February 14, 1942, Serial No. 430,860

11 Claims. (Cl. 103—26)

This invention relates to a liquid fuel feeding mechanism for burners of the type commonly called "oil lifters," and wherein a motor-driven pump is employed for pumping the oil or liquid fuel from a bulk storage tank, or other source of supply, to a receptacle having a liquid supply chamber and disposed adjacent to or constituted as a part of the burner. Ordinarily, the liquid fuel flows to the burner by gravity under the control of suitable metering and control devices, such as the common constant level devices of the type shown and described in Patent 2,068,138, granted January 19, 1937, to Roy W. Johnson, for "Devices for controlling flow of fluid to oil burners and the like."

The object of the invention is to provide a liquid fuel feeding mechanism of this character, which is simple, practical, and closely organized in construction, reliable, safe, and efficient in operation, easy and comparatively inexpensive to manufacture, and capable of being conveniently installed.

Another object is to provide liquid fuel feeding mechanism of this character, and having these advantages, and which is so constituted and organized that its various elements are readily accessible for purposes of adjustment, replacement, or repair.

Another object of the invention is to provide liquid fuel feeding mechanism of this character, and having the foregoing advantages, and which embodies in its construction an automatically operable safety device, functioning to prevent flooding of the mechanism in the event of failure of main control of the pump motor.

In one form of the invention the safety device operates to effect automatic return of substantially all of the liquid from the liquid fuel supply chamber of the fuel feeding mechanism back to the bulk storage tank or source of supply of liquid fuel. In an alternative or modified form of the invention the safety device varies the action of the pump so that it merely recirculates rather than pumps the liquid fuel. In either instance the action is such that the pump remains primed.

Another object of the invention is to provide liquid fuel mechanism of this character, and having these advantages, and so constituted and organized that the motor, while effectively controlled and protected, is also combined in a compact and advantageous manner with the pump so as not only to directly drive the same but to smooth out the action upon starting of the motor and upon fluctuations in the load imposed thereon.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view partly in transverse, vertical cross section, and partly in elevation, illustrating a liquid fuel feeding mechanism embodying the present invention;

Figure 2 is a view in top plan on reduced scale of the liquid fuel feeding mechanism shown in Figure 1;

Figure 3 is a view thereof in side elevation illustrating how the mechanism may be supported on a wall or other suitable support;

Figure 4 is a view in transverse, horizontal cross section, taken on line 4—4 of Figure 5;

Figure 5 is a view partly in side elevation and partly in vertical section, illustrating the main control switch for the motor, its operating mechanism, and the manner in which the main float is combined with the switch-operating mechanism;

Figure 6 is a fragmentary detail view, in section, taken on line 6—6 of Figure 5, and looking in the direction of the arrows;

Figure 7 is a view in top plan of the liquid fuel feeding mechanism embodying the invention, with the cover removed to illustrate the terminal board and the way the leads or conductors are combined therewith and with the pump motor;

Figure 8 is a fragmentary detail view, partly in vertical cross section and partly in vertical side elevation, showing one of the motor supports;

Figure 9 is a view in bottom plan of the terminal board and switches carried thereby;

Figure 10 is a view in vertical cross section, taken on line 10—10 of Figure 9;

Figure 11 is a fragmentary view in vertical cross section, taken on line 11—11 of Figure 9;

Figure 12 is a view in top plan of the pump head of the rotary pump incorporated in the liquid fuel feeding system embodying the present invention;

Figure 13 is a view in transverse cross section, taken on line 13—13 of Figure 12;

Figure 14 is a view in horizontal cross section taken on line 14—14 of Figure 15;

Figure 15 is a fragmentary view in vertical cross section, taken on line 15—15 of Figure 14;

Figure 16 is a view in bottom plan of the lower face of the pump head;

Figure 17 is a fragmentary view in vertical cross section taken on line 17—17 of Figure 12;

Figure 18 is a fragmentary view in top plan showing a modified form of the pump head of the rotary pump and Figure 19 is a fragmentary view in transverse, vertical cross section taken on line 19—19 of Figure 18, but showing the ball check valve and the safety valve assembled with the pump head.

Referring to the drawings, it will be seen that liquid fuel feeding mechanism embodying the present invention comprises, in general, a receptacle or tank 1 provided with a supply chamber 2 for the liquid fuel. The low point in the supply chamber 2 is provided with an outlet 3 equipped with an outlet fitting 4 adapted to be connected by a suitable pipe line (not shown) to the burner or to a constant level device of the type described in the patent above referred to. The top 5 of the receptacle 1 is provided with a central flanged opening 6 surrounded by a gasket 7.

A circular supporting plate 8 is provided and rests on the flange of the opening 6 and the gasket 7. The supporting plate 8 is releasably secured in position on the receptacle by means of screws 9 preferably three in number (see Figure 7). The screws 9 are threaded into the top 5 of the receptacle 1 with their heads spaced from the upper surface of the top and they coact with keyhole slots 10 provided in the supporting plate 8 to perform the function of releasably securing the plate 8 in position.

A rotary vane type pump, designated generally as at 11, is provided, and in the assembly is located within the supply chamber 2 of the receptacle 1 and is positioned near the bottom of the supply chamber 2 so as to be submerged in the liquid fuel therein when the device is in operation. The pump 11 comprises preferably a pump head 12, the undersurface 12' of which is machined or ground flat and plane to adapt it to coact with complemental pump chamber forming members 13 and 14. The member 13 is in the form of an annulus or ring and provides the peripheral wall of the pump chamber, whereas the member 14 is in the form of a circular plate and provides one of the side walls of the pump chamber, the other side thereof being constituted by a portion of the under face 12' of the pump head 12. The pump chamber proper is designated at 15. The ring or annulus 13 and circular plate 14 are disposed eccentrically to the central axis of the pump head so that the pump chamber 15 is slightly eccentric to this axis. Screws and lock washers 16 are extended through openings provided therefor in the members 13 and 14 and are threaded into the pump head 12 to releasably secure these parts assembled. A rotor 17 is rotatably fitted in the chamber 15. This rotor consists of a disc of metal having a plurality of angularly spaced, transversely extending slots 18, extending out through the periphery of the rotor and being disposed at an angle to the radii of the rotor, as illustrated clearly in Figure 14. Sliding pump vanes 19 are fitted in these slots and their outer edges wipe against the peripheral wall of the pump chamber while the side edges thereof wipe against the side walls of the pump chamber 15. A rotor shaft 20 is provided and may be integral with or suitably fixed to the rotor 17. This shaft is a short shaft and is rotatably fitted to the bearing opening 21 formed integral with the pump head (see Figure 1). The rotor shaft 20 projects above the bearing 21 and terminates in a flattened end 22 for a purpose which will be hereinafter more fully described.

The pump is rigidly supported in position in the chamber 2 of the receptacle 1, and this may be conveniently accomplished by means of a plurality of, preferably three, hanger straps, designated generally at 23. These hanger straps 23 are of identical construction and are located at equal angular intervals about the pump head. The upper end of each hanger strap 23 is inturned, as at 24, and is riveted or otherwise secured, as at 25, to the supporting plate. The lower end of each hanger strap is shaped and apertured to adapt it to be fastened to the pump head, the fastening being effected by screws 26.

The detail construction of the pump head is shown in Figures 1 and 12 to 17, inclusive. The under face 12' of the pump head 12 is formed with an inlet groove 27 and an outlet groove 28, both in open communication with the pump chamber. The outlet groove 28 is also in open communication with an outlet passage 29, which extends entirely through the pump head 12 and discharges into the liquid supply chamber 2 of the receptacle 1. The inlet groove 27 is in open communication with the lower end of an inlet passageway 30 which inclines upwardly through a thickened portion of the pump head 12 and freely communicates at its upper end with the chamber 31 of a ball check valve 32 (see Figure 17). The ball check valve 32 is at the bottom of the chamber 31 and is engageable with a valve seat 33 provided in a vertical passage 34 which is in effect a continuation of the chamber 31. Access to the ball check valve 32 and its seat 33 is had by virtue of the provision of a removable plug or closure 35 at the upper end of the chamber 31. The lower end of the passage 34 communicates with the horizontal inlet passage 36 which extends over to and is in open communication with a vertical inlet passage 37.

An oil supply pipe 38 has its lower end fitted in this passage 37 and is secured and sealed to the walls thereof by a packing nut or gland 39. The pipe 38 is preferably copper tubing and its upper end is secured by a compression coupling 40 to the inner end of an inlet nipple 41. The inlet nipple 41 is carried by a bracket 42 provided on the supporting plate 8 and is adapted to be connected to a pipe line leading to a bulk storage tank or other source of supply of liquid fuel which is located below the level of the receptacle 1.

With this construction, when the rotor 20 of the pump is rotated, the vanes 19 are forced outwardly under the influence of centrifugal force, and as they wipe past the inlet groove 27, they pick up the oil supplied thereto through the oil supply pipe 38 and inlet passages 37, 36, 34, and 30, and the oil is carried around through the pump chamber 15 and is forced into the outlet groove 28 and up through the outlet passages 29 into the liquid supply chamber 2 of the receptacle 1.

An electric motor 45 is provided for driving the pump. The motor 45 may be mounted in any suitable way on and above the supporting plate 8. As illustrated in Figures 7 and 8, screws 46 may project from the housing in the motor and extend through eyelets 47 supported on elastic grommets or sleeves 48 carried by angle brackets 49 which in turn are fixed to uprights 50 secured to and supported on the plate 8.

The motor is disposed with its armature shaft 51 vertically and in alinement with the rotor shaft 20 of the pump. The lower end of the armature shaft 51, which extends through an opening in the center of the plate 8, is slotted, as at 52, to receive a laterally extending terminal 53 of a spring coupling 54. A similar laterally extending terminal 55 at the lower end of the spring coupling interfits at the slotted end 56 of a drive shaft 57. The lower end of the drive shaft 57 is provided with a flattened portion 58—that is, with a portion of non-circular cross section, and this flattened portion 58 of the shaft 57 is interfitted with a correspondingly formed socket or axial opening 59 of a coupling sleeve 60. A set screw 61 secures the coupling sleeve against accidental displacement off the lower end of the shaft. The lower end of the coupling sleeve 60 is also provided with a socket 62 which has a cross section corresponding to that of the upper end 22 of the flat rotor shaft 20 so that when the socket 61 is slipped over the upper end of the rotor shaft, the rotor will be coupled to the drive shaft 57.

With this construction, when the motor 56 is running, the pump is driven. On starting, and upon fluctions in load, the spring coupling 54 smooths out the action and relieves the motor of sudden shocks or loads. Another advantage of the construction thus far described is that the bearing of the rotor shaft is automatically or self-lubricated.

The present invention proposes to intermittently or periodically run the motor 45 and operate the pump 11 to maintain the desired supply of liquid fuel in the liquid supply chamber 2. Generally speaking, this is accomplished by incorporating a suitable switch in the motor circuit, which, when closed, will complete the circuit and cause the motor to run, and which, when open, will break the circuit and stop the motor. This switch is in turn controlled by a float or other liquid level responsive means positioned in the liquid supply chamber and operatively interconnected with the switch to open and close the switch upon predetermined rise and fall, respectively, of the liquid level in the supply chamber 2.

In the construction illustrated, a terminal board 64 is supported on the uprights 50 above the motor 45. A snap-acting toggle switch, designated generally at S, is carried by the under side of the terminal board and is connected in controlling relation in the circuit of the electric motor 45.

This snap-acting toggle switch includes a fixed contact, designated generally at 65, the fixed contact 65 having a contact button 65' supported by a contact carrier strip 66 which is secured to and supported on, as well as in good electrical contact with, the terminal or binding post 67 carried by the terminal board 64. A movable contact button 68 is cooperatively related with the fixed contact button 66.

Movable contact button 68 of the switch S is controlled by a toggle mechanism of special construction. As illustrated in Figures 9 and 10, this toggle mechanism comprises stiffly resilient toggle members T and T' constituted by portions of the one-piece metal stamping M. The stamping M is stamped or punched out of a thin piece of spring steel or other appropriate metal of good electrical conductivity, and it is fashioned with side members 70 and 70' cross connected at their ends by cross members 71 and 72. The end member 71 is tapered and apertured to adapt it to support and be fixedly connected to the shank of the movable contact button 68, and also has a centrally disposed, inwardly directed, tapered projection 71' integrally formed therewith. The end member 72 has a centrally disposed, inwardly directed finger 72' integrally formed therewith, the inner end of the finger 72' being tapered and being longitudinally alined with or slightly spaced from the tapered projection 71'. Intermediate portions of the side members 70 and 70' are fixedly supported on though in spaced relation to the underside of the terminal board 64, and this may be conveniently accomplished by bolts and nuts 73 and spacing sleeves 74, which also serve to secure a stop bracket 76 in position. One set of bolts and nuts 73 is also employed to secure the contact clip 75' in position, this contact clip being provided at one end of a wire 75 which leads to one terminal of the motor 45. The contact clip is thus in good electrical contact with the metal stamping M, and consequently in electrical connection with the movable contact 68. The toggle switch is completed by the toggle spring 77 compressed between spring cups 78 and 79, the bottoms of which are indented or socketed to adapt them to be interfitted with the tapered projection 71' of the toggle arm or member T in the tapered end of finger 72' of the toggle arm T', respectively. A switch operator 80 in the form of a strip of insulating material has a portion securely fixed by rivets 81 to the toggle arm T' of the stamping M.

The other terminal of the motor is connected by a wire 82 to an angular bracket 83 secured by bolts and nuts 84 to the underside of the terminal board. One of the screws 84 takes part in securing the wire 82 to the bracket 83. The bracket 83 is constituted of metal of good thermal conductivity and its depending leg is fixedly secured to a leg 85 of the U-shaped bi-metallic strip or thermostatic leaf 86. The other leg 87 of this leaf has a tapered end 88 and is provided with a latching hole 89 adjacent said tapered end 88. A contact 90 of springy material is supported by means of a bracket 91 on the underside of the terminal board and is adapted to have its outer end engage in the hole of the leg 87 of the bi-metallic leaf 87 when normal temperatures prevail. When so engaged, however, the spring contact 90 is flexed or tensioned against its inherent elasticity. If the motor heats up beyond a predetermined point, the bi-metallic leaf 86 will warp under the influence of the increased temperature so that the leg 87 thereof will move toward the leg 87 and pull the hole of the leg 87 off of the end of the spring contact 90 whereupon the spring contact 90 snaps clear of the bi-metallic leaf and breaks the motor circuit. One side of the line is connected by wire 92 to a binding post 92', which is in electrical contact with the bracket 91, the latter being of material of good electrical conductivity and in direct electrical contact with the spring contact 90. The other side of the line is connected by wire 93 to binding post 67. In other words, the snap-acting toggle switch S and the thermal switch, constituted by the bi-metallic leaf 86 and the spring contact 90, are connected in series in the motor circuit.

When normal temperatures are restored, the thermal switch may be readily reset by means of a resetting plunger 95 supported in bearings provided therefor in the supporting bracket 96 carried by the thermal board. A spring 97 biases the plunger to its outer inoperative position, but it may be manually pressed inwardly against the action of this spring to cause it to engage the spring contact 90 and press the same inwardly whereupon the end of the spring contact coacts with the inclined end 88 of the leg 87 of the bimetallic leaf to cam the same toward the leg 85 until the end of the spring carrier 90 is alined with the notch. Thereupon the leg 87 springs back so that the notch receives and latches the spring contact 90 in the closed position of the switch.

For the purpose of automatically operating the snap action toggle switch S, operating mechanism is provided therefor and includes a vertically reciprocable switch operator 100 which may be in the form of a rod which is guided for vertical movement in guide brackets 101, 102 carried by the thermal board and a supporting plate, respectively. Two adjustable abutments or collars 103 and 104 are threaded on the upper end of the rod and are held in adjustment by a spring 105 interposed between them. A spring 106 may be interposed between the lower abutment in the guide bracket 101 to counterbalance the weight of the operating mechanism. The lower end of the switch operator 100 is pivotally connected with the intermediate portion of a switch operating lever 107. One end of this lever is fulcrumed, as at 108, on the supporting plate 8 and the opposite end connects with the end of an elongated link 109. The lower end of this link 109 is interconnected with the float 110 in a special manner now to be described.

The float 110 has a float arm 111 affixed thereto. The outer end of this float arm 111 is enlarged—that is, the float arm is substantially T shaped. A pair of links are employed as interconnecting means between the float arm and the link 109. The upper of these links is designated at 112, the lower at 113. Each link is fulcrumed at one end, as indicated at 114, on a fulcrum bracket 115 carried by one of the hanger straps. The opposite end of each link is pivotally connected to the enlarged outer end of the float arm, as indicated at 116. The parts are so proportioned and dimensioned that the distance between the fulcra of the links 112 and 113 is greater than the distance between their pivotal connections of the float arms. The lower end of the link 109 is pivotally interconnected with an intermediate portion of the upper link 112. With this link arrangement between the float arm and the link 109, the float 110 may move through a substantial distance up and down, and yet it does not move laterally to any appreciable extent but will move approximately along a vertical rectilinear path. The advantages of this is that the requisite float travel may be had in a very compact construction without the float engaging the drive shaft or coming into engagement with any other obstruction.

In the event the float 110 should leak, or should it fail in its action for any other reason, and the motor should continue to run to the point where there would be danger of the mechanism flooding or over-flowing, provision is made to automatically siphon the liquid fuel from the supply chamber 2 back to the bulk storage tank or other source of supply. For carrying out this purpose the pump head 12 is provided with a radial passage 120 freely communicating at one end with the inlet passage 37 and communicating at its opposite end with a vertical passage 121 extending up through the top of the pump head. The upper portion of this vertical passage 121 is internally threaded to receive the lower threaded end of the valve body 122. The valve body 122 has an opening 123 extending axially therethrough and also transverse openings 124 opening into the supply chamber. Just below the transverse openings 124 the valve body is provided with a valve seat 125. A needle valve 126 is slidably fitted in the longitudinal opening of the valve body and its lower point or tapered end cooperates with the valve seat 125. The valve is normally closed but is automatically opened by a safety float 130 on the rise of liquid level in the supply chamber to a predetermined degree. The float 130 has a float arm 131 fixed thereto and is freely pivoted or fulcrumed on a suitable support, as indicated at 132. A link 134 has its upper end connected to the float arm 131 and its lower end pivotally connected to a collar 135 fixed to the upper end of the needle valve. A light coil spring 136 may be provided to counterbalance the weight of the float, its arm, and link. When the main float fails, and the float 130 is buoyed up, it pulls the valve 126 off of its seat and since the bulk storage tank or main source of supply of liquid fuel is located at a level lower than that of the liquid supply tank 2, the liquid in the tank will automatically siphon back to the bulk storage tank or main source of supply of liquid fuel through the valve body 122 through the passages 121, 120 and the supply line 38.

While the siphoning of the liquid fuel back to the main source of supply, when the safety device is thrown into action, is desirable in many instances, substantially the same results may be obtained by varying the construction of the pump head in such manner that instead of the siphoning action the pump may be caused to merely recirculate the liquid fuel. For example, as illustrated in Figures 18 and 19, the pump head, designated at 12a, and corresponding in the main to the pump head 12, may be so constructed that the passage 120 is eliminated, and in lieu of the passage 120, a passage 120a may be provided. The passage 120a extends at an angle from the bottom of the vertical passage 121 to the upper portion of the chamber 31. In other words, the passage 120a communicates with the chamber 31 above the ball check valve 32. With this construction, when the safety valve 126 is opened, the pump merely recirculates the liquid fuel in the supply chamber 2.

The device is illustrated as being embodied in the type which has its own receptacle, although, of course, the receptacle may be constituted as a part of the burner. Where a separate receptacle is utilized, then it is usually equipped with suitable mounting means. This may consist of a split clamping band 140 having outturned aperture lugs 141 at its ends. These lugs are adapted to be alined with openings provided in the side members of a bracket 142, and to be secured thereto by bolt and nut 143. The bracket 142 may be attached by screws 144, or other suitable fastening means, on a wall or stationary support, in the manner illustrated in Figures 2 and 3.

It is also usually desirable to provide a cap or cover 145 for the motor and terminal board, and such cap or cover is releasably secured in place by tightening up clamping screws 146 carried by brackets 148 rigidly attached to the supporting plate 8 and coacting with slots 149 provided in the cap or cover. The wires 92 and 93 may be combined into a cable 150 equipped with a plug 151 adapted to be plugged into a wall socket.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A liquid fuel feeding mechanism adapted to be assembled with a receptacle for liquid fuel and comprising a pump depending into the receptacle and submerged in the liquid fuel therein, said pump having an inlet connected with a source of supply of liquid fuel and having an outlet discharging into said receptacle, an electric motor supported exteriorly of the receptacle and having a driving connection with said pump, means responsive to changes of liquid level in said receptacle to control the action of the motor so as to cause a supply of liquid to be maintained in said receptacle, there being a vent intermediate the inlet to the pump and the source of supply of liquid fuel, said vent opening into said receptacle, a valve biased to closed position and normally closing said vent, and means actuated upon rise of liquid in the receptacle above a predetermined level to open said valve.

2. A liquid fuel feeding mechanism adapted to be assembled with a receptacle for liquid fuel and comprising a rotary pump including a pump head and cooperable pump chamber forming members, a rotor in said pump chamber, means supporting said pump within the receptacle and submerged in the liquid fuel therein, said pump head having an inlet leading to the pump chamber and an outlet leading from said chamber to the interior of the receptacle, a suction line connected to said inlet and communicating with a source of supply of liquid fuel disposed at a lower level than the receptacle, an electric motor having a driving connection with the rotor of said pump, means responsive to changes of liquid level in said receptacle to control the action of the motor so as to cause a supply of liquid to be maintained in said receptacle, said pump head having a vent opening interposed between the suction line and the inlet of the pump, a valve normally closing said vent opening, and a safety float disposed in the receptacle and connected to the valve and operable to open the valve upon rise of the liquid in said receptacle above a predetermined level, whereupon liquid is syphoned from the receptacle back to the source of supply thereof.

3. A liquid fuel feeding mechanism adapted to be assembled with a receptacle for liquid fuel and comprising a rotary pump including a pump head and cooperable pump chamber forming members, a rotor in said pump chamber, means supporting said pump within the receptacle and submerged in the liquid fuel therein, said pump head having an outlet communicating with the interior of the receptacle and also having inlet passages communicating at one end with the pump chamber, a suction line connected to the other end of said inlet passages and communicating with a source of supply of liquid fuel disposed at a lower level than the receptacle, an electric motor having driving connection with the rotor of the pump, means responsive to changes in liquid level in said receptacle to control the action of the motor so as to cause a supply of liquid to be maintained in said receptacle, said pump head having a vent passage communicating with an intermediate portion of the inlet passages at one end and with the interior of the receptacle at its other end, a valve normally closing said vent passage, a safety float disposed in the receptacle and connected to said valve and operable to open the same upon rise of liquid in said receptacle above a predetermined level, whereupon liquid is syphoned from the receptacle back to the source of supply thereof, and a check valve incorporated in the inlet passage in between the point of their communication with the pump chamber and the point of communication of the vent passage therewith, whereby to maintain the pump primed after occurrence of said syphoning action.

4. A liquid fuel feeding mechanism adapted to be assembled with a receptacle for liquid fuel having an opening in its top and comprising a supporting plate adapted to be mounted on the receptacle and to provide a closure for said opening, a rotary pump including a pump head and cooperable pump chamber forming members, said members and said pump head being detachably secured together, a rotor in said pump chamber, hangers supporting the pump head from said plate so that the pump, in the assembly, is disposed in the lower portion of the receptacle, said pump head having an inlet leading to the pump chamber and an outlet leading from the chamber into the interior of the receptacle, a suction line connected to said inlet and communicating with a source of supply of liquid fuel, an electric motor mounted on the top of the supporting plate and coaxially disposed with respect to the rotor of the pump, shaft and coupling means providing a driving connection between the motor and the rotor of the pump, and means responsive to changes of liquid level in said receptacle to control the action of the motor so as to cause a supply of liquid to be maintained in said receptacle.

5. A liquid fuel feeding mechanism adapted to be assembled with a receptacle for liquid fuel having an opening at its top and comprising a supporting plate mounted on the receptacle and providing a closure for said opening, a rotary pump including a pump head and cooperable pump chamber forming members, said members and said pump head being detachably secured together, a rotor in said pump chamber, hangers supporting said pump from said plate, said pump head having an inlet leading to the pump chamber and an outlet leading from the chamber into the interior of the receptacle, a suction line connected to the said inlet and communicating with a source of supply of liquid fuel disposed at a lower level than the receptacle, an electric motor mounted on the top of the plate and coaxially disposed with respect to the pump, shaft and coupling means providing a driving connection between the motor and the rotor of the pump, means responsive to changes of liquid level in said receptacle to control the action of the motor so as to cause a supply of liquid to be maintained in said receptacle, said pump head having a vent opening interposed between the suction line and the inlet of the pump chamber, a valve normally closing said vent opening, and a safety float disposed in the receptacle and connected to said valve and operable to open the valve upon rise of the liquid in said receptacle above a predetermined level whereupon liquid is syphoned from the receptacle back to the source of supply thereof.

6. In combination with a receptacle for liquid fuel, a rotary pump submerged in the liquid fuel in said receptacle, said pump having an inlet connected with a source of supply of liquid fuel and an outlet discharging into said receptacle, an electric motor coaxially disposed with respect to said pump, shaft and coupling means providing a driving connection between said motor and said pump, a circuit for the motor, a switch incorporated in said circuit for opening and closing the same, a float disposed in the lower portion of the receptacle and extending part way around said shaft and coupling means, a T-shaped float arm fixed to the float, a pair of links swingable about spaced fixed fulcra, and having their ends opposite their fulcra pivoted to the ends of the cross member of the float arm, and a connection between one of said links and said switch.

7. In combination with a receptacle for liquid fuel having an opening in its top, liquid fuel feeding mechanism comprising a support mounted on the receptacle above the opening thereof, a rotary pump suspended from the support and submerged in the liquid fuel in said receptacle, said pump having an inlet connected with a source of supply of liquid fuel and an outlet discharging into said receptacle, an electric motor mounted on the top of the support and coaxially disposed with respect to said pump, shaft and coupling means providing a driving connection between said motor and said pump, a circuit for the motor, a terminal board supported above the motor, a snap action toggle switch carried by the underside of the terminal board, a reciprocable operator for the switch, a switch operating lever having one end fulcrumed on the support and having an intermediate portion connected to said reciprocable switch operator, a float disposed in the receptacle to one side of said shaft and coupling means, a T-shaped float arm fixed to the float, a pair of links swingable about spaced fixed fulcra, and having their ends opposite their fulcra pivoted to the ends of the cross member of the float arm, the distance between the fulcra of the links being greater than the distance between their pivotal connections with the float arm, and an elongated link having one end connected to the leg of the T-shaped float arm and its other end connected to the switch operating lever.

8. A liquid fuel feeding mechanism adapted to be assembled with a receptacle for liquid fuel and comprising a rotary pump having a pump chamber, a rotor in said pump chamber, means supporting the pump within the receptacle and submerged in the liquid fuel therein, said pump having an inlet leading to the pump chamber and an outlet leading from said chamber to the interior of the receptacle, a suction line connected to said inlet and communicating with a source of supply of liquid fuel disposed at a lower level than the receptacle, a motor having a driving connection with the rotor of the pump, means responsive to changes of liquid level in said receptacle to control action of the motor so as to cause the supply of liquid to be maintained in the receptacle, said pump having a vent opening interposed between the suction line and the inlet to the pump, a valve normally closing said vent opening, and a safety float disposed in the receptacle and connected to the valve and operable to open the valve upon rise of the liquid in said receptacle above a predetermined level whereupon liquid is siphoned from the receptacle back to the source of supply therein.

9. A liquid fuel feeding mechanism adapted to be assembled with the receptacle for liquid fuel and comprising a pump depending in the receptacle and submerged in the liquid fuel therein, said pump having an inlet connected with a source of supply of liquid fuel and having an outlet discharging into said receptacle, a motor for driving the pump, means responsive to changes of liquid level in said receptacle to control the action of the pump so as to cause a supply of liquid fuel to be maintained in said receptacle, said pump having a passage intermediate its inlet and its connection with the source of supply and opening into the interior of the receptacle, a valve normally closing said passage, and means actuated upon rise of liquid in the receptacle above a predetermined level and connected to the valve so as to automatically open the valve upon rise of the liquid in the receptacle to a point above said predetermined level whereupon the pump merely effects recirculation of the liquid fuel in the receptacle.

10. In a device for maintaining a supply of liquid, a receptacle for the liquid, a rotary pump in the receptacle and including a pump head having an inlet and an outlet therein and members dependent from the head and forming a pump rotor chamber below the pump head, a conduit connecting the inlet with a source of liquid exteriorly of the receptacle, the pump head having an opening into the receptacle intermediate the inlet and the conduit, a valve biased to close the intermediate opening, means responsive to rise in liquid level in the receptacle beyond a predetermined amount and acting to open the valve, a motor drivingly connected with the pump rotor, and means for controlling operation of the motor responsive to a rise in the liquid level in the receptacle.

11. In a liquid feeding mechanism, a receptacle having an outlet therefrom, a rotary pump in the receptacle for discharging thereinto, said pump comprising a pump head formed with inlet and outlet openings therein and forming a cup-like pocket about the outlet opening whereby a reserve of liquid is always maintained in the pocket for priming the pump and an imperforate member forming a pump rotor chamber in cooperation with and below the head, a conduit connecting the inlet opening with a source of liquid, a motor driving the pump rotor, and means responsive to changes in the liquid level in the receptacle for controlling operation of the motor.

ROY W. JOHNSON.
CEDRIC E. ZARWELL.